(12) United States Patent
Beatty, Jr. et al.

(10) Patent No.: US 7,570,465 B2
(45) Date of Patent: Aug. 4, 2009

(54) INDUSTRIAL ARC FAULT CIRCUIT INTERRUPTER AND METHOD OF DETECTING ARCING CONDITIONS

(75) Inventors: William E. Beatty, Jr., Beaver Brighton, PA (US); Douglas J. Carolan, Columbia, SC (US); Xin Zhou, Franklin Park, PA (US)

(73) Assignee: Eaton Corporation, Cleveland, OH (US)

( * ) Notice: Subject to any disclaimer, the term of this patent is extended or adjusted under 35 U.S.C. 154(b) by 48 days.

(21) Appl. No.: 11/959,898

(22) Filed: Dec. 19, 2007

(65) Prior Publication Data

US 2009/0161270 A1 Jun. 25, 2009

(51) Int. Cl.
*H02H 3/00* (2006.01)
(52) U.S. Cl. ...................................... 361/42
(58) Field of Classification Search ............... 361/42–50
See application file for complete search history.

(56) References Cited

U.S. PATENT DOCUMENTS

| | | | |
|---|---|---|---|
| 5,206,596 A | 4/1993 | Beihoff et al. | |
| 5,224,006 A | 6/1993 | MacKenzie et al. | |
| 5,691,869 A | 11/1997 | Engel et al. | |
| 5,729,145 A * | 3/1998 | Blades | 324/536 |
| 5,835,321 A | 11/1998 | Elms et al. | |
| 5,933,305 A | 8/1999 | Schmalz et al. | |
| 5,936,406 A * | 8/1999 | Potthast | 324/318 |
| 6,111,733 A * | 8/2000 | Neiger et al. | 361/42 |
| 6,414,829 B1 | 7/2002 | Haun et al. | |
| 6,522,228 B2 | 2/2003 | Wellner et al. | |
| 6,522,509 B1 | 2/2003 | Engel et al. | |
| 6,542,056 B2 | 4/2003 | Nerstrom et al. | |
| 6,577,478 B2 * | 6/2003 | Kim et al. | 361/42 |
| 6,590,757 B2 | 7/2003 | Pahl et al. | |
| 6,710,688 B2 | 3/2004 | Wellner et al. | |
| 6,798,628 B1 * | 9/2004 | Macbeth | 361/42 |
| 7,110,864 B2 | 9/2006 | Restrepo et al. | |
| 7,148,696 B2 | 12/2006 | Zhou et al. | |
| 7,161,775 B2 | 1/2007 | Schmalz | |
| 7,203,040 B2 | 4/2007 | Shipp et al. | |
| 7,253,637 B2 | 8/2007 | Dvorak et al. | |
| 2003/0038640 A1 | 2/2003 | Zuercher et al. | |

(Continued)

OTHER PUBLICATIONS

Underwriters Laboratories, Inc., "UL 1699 Arc-Fault Circuit-Interrupters", Apr. 7, 2006, 112 pp.

*Primary Examiner*—Stephen W Jackson
*Assistant Examiner*—Terrence R Willoughby
(74) *Attorney, Agent, or Firm*—Martin J. Moran

(57) ABSTRACT

A method of detecting arcing conditions includes sensing current and HF signals therefrom; bandpass filtering the HF signals and providing filtered signals; detecting peak signals and envelopes from the filtered signals; counting occurrences of the envelopes exceeding a first value; maintaining temporary values corresponding to the peak signals; determining a trip time as a function of the current; determining if any peak signal is greater than a second value, and responsively increasing a temporary value and, otherwise, decreasing the temporary value; determining if a predetermined function of the temporary values is greater than a fifth value, and adding the temporary values to an accumulator, and otherwise, decreasing the accumulator; and tripping open the power circuit if: a difference between the occurrences of current and immediately previous half cycle having the same polarity is at least two, the accumulator is greater than a seventh value, and the trip time is reached.

22 Claims, 7 Drawing Sheets

U.S. PATENT DOCUMENTS

2004/0027749 A1 2/2004 Zuercher et al.
2005/0017731 A1 1/2005 Zuercher et al.
2006/0254355 A1 11/2006 Zhou

* cited by examiner

INDUSTRIAL ARC FAULT CIRCUIT INTERRUPTER AND METHOD OF DETECTING ARCING CONDITIONS

BACKGROUND OF THE INVENTION

1. Field of the Invention

This invention pertains generally to circuit interrupters and, more particularly, to arc fault circuit interrupters. The invention also relates to methods of detecting arcing conditions.

2. Background Information

Maintenance personnel often need to work on low voltage electric power circuits that are energized, for instance, when testing circuit breakers. The circuit breakers have trip functions designed to protect the power circuits from overloads and overcurrents. These trip functions typically include a delayed trip function that allows downstream circuit breakers closer to the fault to respond first in order to limit interruption of service in that circuit only. The delayed trip function also permits temporary overloads, such as those associated with the starting current of relatively large motors.

The coordination between circuit breakers can be enhanced by zone interlocking in which a breaker lower in the protection hierarchy sends a signal upon detecting a fault to an upstream breaker to temporarily block operation of the latter breaker giving the downstream breaker time to respond. Absence of a zone interlock signal from the downstream breaker indicates that the fault is above that breaker, thereby allowing the upstream breaker to respond relatively more quickly than if its operation were temporarily blocked.

Often, a power circuit breaker will also have an instantaneous trip function that responds, without delay, to relatively very high currents, such as those associated with a short circuit. These circuit breakers can also have a ground fault trip function that typically also incorporates a delay time.

Maintenance and test personnel can be exposed to live terminals when working or making measurements on energized switchgear. The potential for arc flash resulting from an accidental fault requires that such personnel wear protective clothing.

U.S. Pat. No. 7,203,040 discloses an arc reduction maintenance switch (ARMS) for reduction of arc flash energy and the severity of arc flash exposure. Specific trip functions are manually overridden with a maintenance trip function that reduces arc energy should a fault occur. The manually enabled and disabled maintenance trip function reduces the pickup currents of the specified trip functions and/or reduces or eliminates the time delays of the specified trip functions. For example, instantaneous trip is reduced from 10 times to 2 times rated current, short delay pickup is reduced from 8 times to 1.5 times rated current, the short time delay of 0.5 second is reduced to 0.050 second (essentially no time delay), the (equipment protection) ground fault pickup current is reduced from 0.5 times to 0.25 times rated current, and the ground fault time delay is reduced from 0.5 second to 0.050 second (essentially no time delay). As another example, instantaneous trip is reduced from 10 times to 4 times rated current, short delay pickup is reduced from 8 times to 3 times rated current, the short time delay of 0.5 second is reduced to 0.050 second (essentially no time delay), the (equipment protection) ground fault pickup current is reduced from 0.5 times to 0.25 times rated current, and the ground fault time delay is reduced from 0.5 second to 0.050 second (essentially no time delay).

The ARMS reduces arc flash energy by lowering the trip level of a fault and is limited to fault levels higher than the frame rating of a molded case circuit breaker. The ARMS does not detect arcing conditions at fault levels lower than the frame rating. Also, it needs to be armed, when required, and disarmed after service is completed.

Ground faults (such as arc flashes) or most parallel arc faults are short circuit events, which conventional industrial circuit breakers can detect and interrupt. However, such circuit breakers may trip too slowly due to the breaker withstand requirement in some cases. That is why the ARMS feature needs to be armed or the trip level needs to be lowered, while service is being performed, in order that the circuit breaker can trip faster and, therefore, interrupt the fault faster.

In industrial applications, conventional arc fault circuit interrupters (AFCIs) may trip too quickly for "arcing" arising during conventional circuit breaker switching, which may last up to about a full cycle or so.

There is room for improvement in arc fault circuit interrupters.

There is also room for improvement in methods of detecting arcing conditions.

SUMMARY OF THE INVENTION

These needs and others are met by embodiments of the invention, which address identification and resolution of both relatively low and high current arcing conditions such as, for example, loose connections, arcing to ground, phase-to-phase arcing, material breakdown (tracking) and arcing related system wellness. A circuit interrupter senses high frequency current signals associated with arcing to detect an arcing fault or an arc flash and trip the circuit interrupter. Hence, this detects arcing conditions at various current levels and does not require being armed or disarmed. The circuit interrupter can be applied to many industrial system voltage applications.

In accordance with one aspect of the invention, a circuit interrupter comprises: a number of poles, each of the number of poles comprising a pair of separable contacts; an operating mechanism structured to open and close the pair of separable contacts for the number of poles; and a trip mechanism cooperating with the operating mechanism to trip open the number of poles, the trip mechanism comprising a processor and further comprising for each of the number of poles: a first current sensor structured to sense current flowing through the pair of separable contacts of a corresponding one of the number of poles, a number of second current sensors structured to sense a number of high frequency current signals from the current flowing through the pair of separable contacts of the corresponding one of the number of poles, a number of bandpass filters, each of the number of bandpass filters including an input receiving one of the number of high frequency current signals and an output, a number of peak detectors, each of the number of peak detectors including an input receiving the output of a corresponding one of the number of bandpass filters and an output, and a number of envelope detectors, each of the number of envelope detectors including an input receiving the output of a corresponding one of the number of bandpass filters and an output, wherein the processor is structured to: count a count of occurrences of the output of each of the number of envelope detectors exceeding a first predetermined value, maintain a number of temporary values corresponding to the output of each of the number of peak detectors, determine an arc fault trip time as a function of the sensed current flowing through the pair of separable contacts for the number of poles, determine if the output of any of the number of peak detectors is greater than a second predetermined value, and, if so, responsively increase a corresponding one of the number of temporary values by a third predetermined value and, if not, decrease the corresponding one of the number of temporary values by a fourth predetermined value, determine if a predetermined function of the number of temporary values is greater than a fifth predetermined value, and, if so, for each of the number of peak detectors, add the corresponding one of the number of temporary values to an accumulator, and if not, decrease the accumulator by a sixth predetermined value, and cause the operating mechanism to trip open the number of poles if: (a) a difference between the count corresponding to the current one of the half cycles having a polarity and the count corresponding to the immediately previous one of the half cycles having the same polarity is at least two, (b) the accumulator is greater than a seventh predetermined value, and (c) the arc fault trip time is reached.

The processor may be further structured to reset the arc fault trip time if either: (1)(a) said difference is not at least two, or said accumulator is not greater than the seventh predetermined value, or the arc fault trip time is not reached, and (b) said accumulator is less than or equal to an eighth predetermined value; or (2)(a) said difference is not at least two, or said accumulator is not greater than the seventh predetermined value, and (b) the arc fault trip time is reached.

The current flowing through the pair of separable contacts of the corresponding one of the number of poles may be an alternating current including a plurality of half-cycles; the processor may be further structured to input for each of the half-cycles a plurality of samples of each of the number of high frequency current signals; and the processor may be further structured to collect all of the samples before determining, for each of the number of peak detectors, if the corresponding one of the number of temporary values is greater than the fifth predetermined value.

The number of high frequency current signals may be a plurality of high frequency current signals; the number of bandpass filters may be a plurality of bandpass filters; the number of peak detectors may be a plurality of peak detectors; the number of envelope detectors may be a plurality of envelope detectors; the processor may comprise a plurality of comparators, an OR gate and a counter, each of the number of comparators including an output structured to indicate when the output of a corresponding one of the envelope detectors is greater than the first predetermined value, the OR gate including an output structured to provide a logical OR function from the output of each of the comparators, the counter being structured to count occurrences from the output of the OR gate.

As another aspect of the invention, a method of detecting arcing conditions comprises: sensing current flowing through a power circuit; sensing a number of high frequency current signals from the current flowing; bandpass filtering each of the number of high frequency current signals and providing a number of corresponding bandpass filtered signals; detecting a number of peak signals from the number of corresponding bandpass filtered signals; detecting a number of envelopes from the number of corresponding bandpass filtered signals; counting a count of occurrences of the number of envelopes exceeding a first predetermined value; maintaining a number of temporary values corresponding to the number of peak signals; determining an arc fault trip time as a function of the sensed current flowing; determining if any of the number of peak signals is greater than a second predetermined value, and, if so, responsively increasing a corresponding one of the number of temporary values by a third predetermined value and, if not, decreasing the corresponding one of the number of temporary values by a fourth predetermined value; determining if a predetermined function of the number of temporary values is greater than a fifth predetermined value, and, if so, adding the number of temporary values to an accumulator, and if not, decreasing the accumulator by a sixth predetermined value; and tripping open the power circuit if: (a) a difference between the count corresponding to the current one of the half cycles having a polarity and the count corresponding to the immediately previous one of the half cycles having the same polarity is at least two, (b) the accumulator is greater than a seventh predetermined value, and (c) the arc fault trip time is reached.

As another aspect of the invention, a circuit interrupter comprises: separable contacts; an operating mechanism structured to open and close the separable contacts; and a trip mechanism cooperating with the operating mechanism to trip open the separable contacts, the trip mechanism comprising: a processor, a first current sensor structured to sense current flowing through the separable contacts, a number of second current sensors structured to sense a number of high frequency current signals from the current flowing through the separable contacts, a number of bandpass filters, each of the number of bandpass filters including an input receiving one of the number of high frequency current signals and an output, a number of peak detectors, each of the number of peak detectors including an input receiving the output of a corresponding one of the number of bandpass filters and an output, and a number of envelope detectors, each of the number of envelope detectors including an input receiving the output of a corresponding one of the number of bandpass filters and an output, wherein the processor is structured to: count a count of occurrences of the output of each of the number of envelope detectors exceeding a first predetermined value, maintain a number of temporary values corresponding to the output of each of the number of peak detectors, determine an arc fault trip time as a function of the sensed current flowing through the pair of separable contacts for the number of poles, determine if the output of any of the number of peak detectors is greater than a second predetermined value, and, if so, responsively increase a corresponding one of the number of temporary values by a third predetermined value and, if not, decrease the corresponding one of the number of temporary values by a fourth predetermined value, determine if a predetermined function of the number of temporary values is greater than a fifth predetermined value, and, if so, for each of the number of peak detectors, add the corresponding one of the number of temporary values to an accumulator, and if not, decrease the accumulator by a sixth predetermined value, and cause the operating mechanism to trip open the separable contacts if: (a) a difference between the count corresponding to the current one of the half cycles having a polarity and the count corresponding to the immediately previous one of the half cycles having the same polarity is at least two, (b) the accumulator is greater than a seventh predetermined value, and (c) the arc fault trip time is reached.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number" shall mean one or an integer greater than one (i.e., a plurality).

As employed herein, the term "current sensor" shall mean a current transformer or any suitable sensor for sensing current flowing through a conductor.

The invention is described in association with a three-pole industrial arc fault circuit breaker for a three-phase system, although the invention is applicable to a wide range of arc fault circuit interrupters having any number of poles for systems having any number of corresponding phases.

Figure 1A:
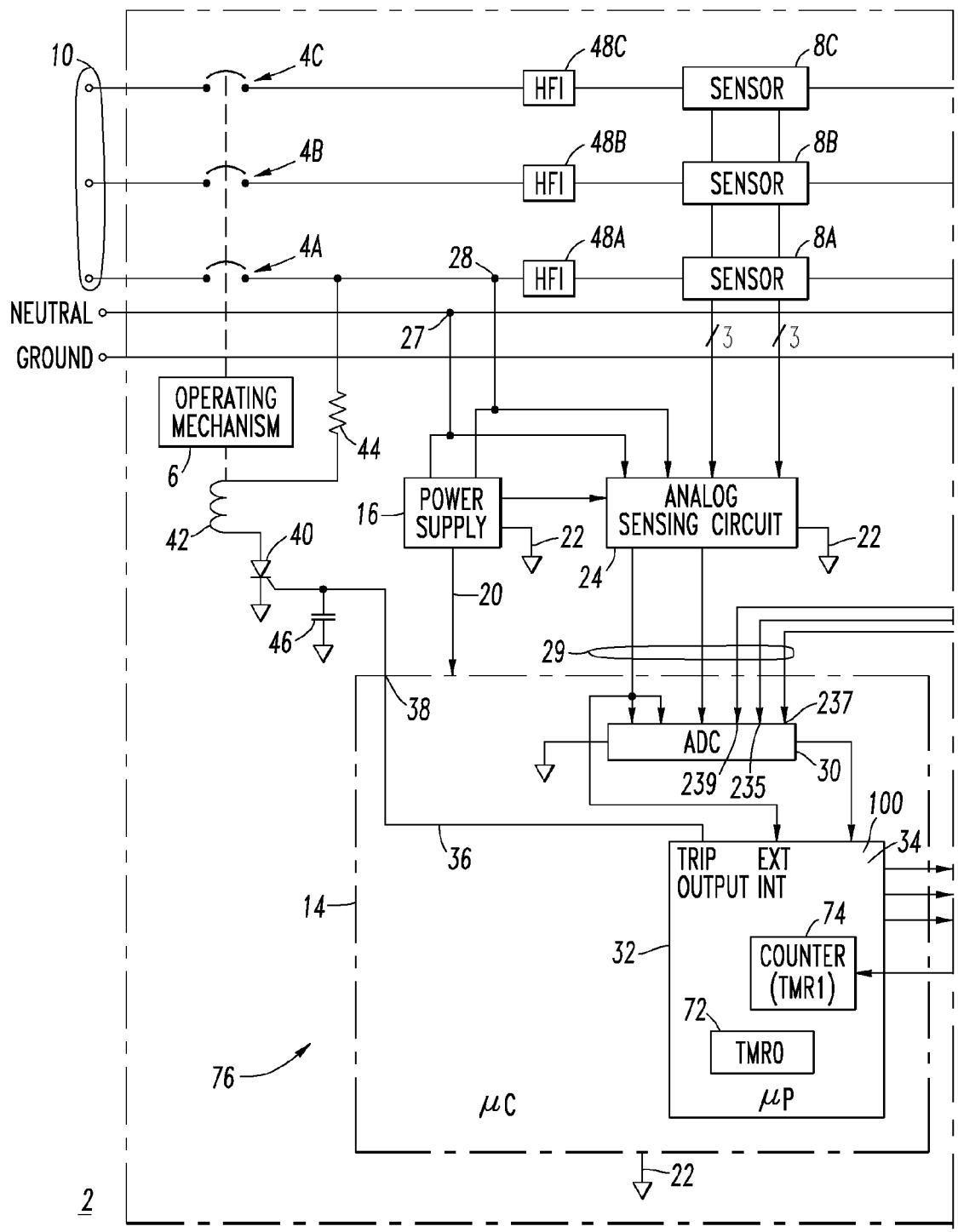
FIGS. 1A-1B form a block diagram of a circuit breaker in accordance with embodiments of the invention.
Figure 1B:
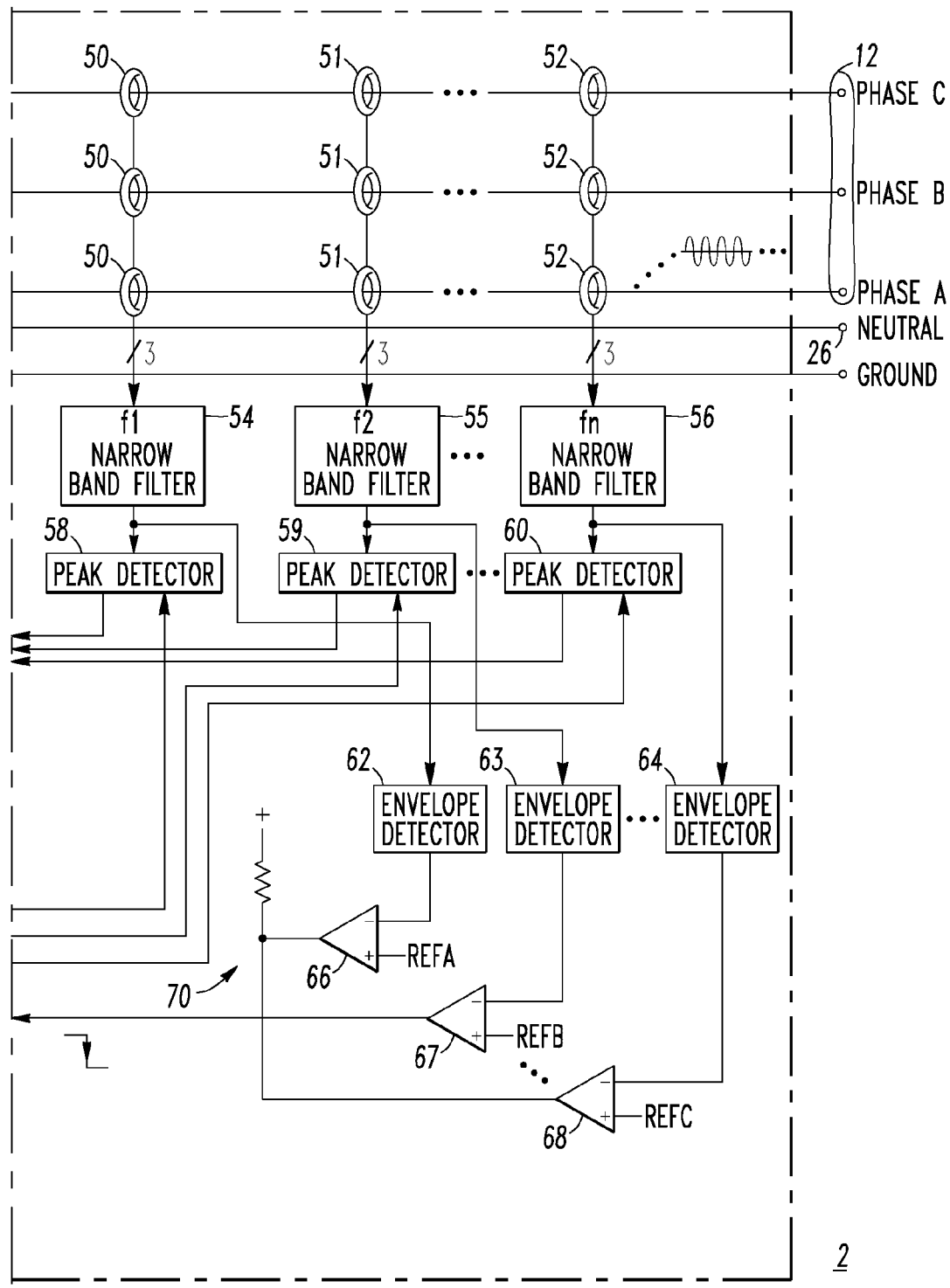

Referring to FIGS. 1A-1B, a three-pole circuit interrupter, such as an industrial arc fault circuit breaker 2, includes pairs of separable contacts 4A,4B,4C, an operating mechanism 6 structured to open and close the separable contacts 4A,4B,4C, and sensors 8A,8B,8C structured to sense current flowing through the respective separable contacts 4A,4B,4C between three-phase line terminals 10 and three-phase load terminals 12. The circuit breaker 2 also includes a processor, such as the example microcomputer (μC) 14 (e.g., without limitation, a Microchip PIC 16F685 microcontroller, marketed by Microchip Technology Incorporated of Chandler, Ariz.), cooperating with the sensors 8A,8B,8C and the operating mechanism 6 to trip open the separable contacts 4A,4B,4C, and a power supply 16 structured to at least power the μC 14. The power supply 16 is, for example, an alternating current (AC) to direct current (DC) (AC/DC) power supply which, for example, inputs neutral from node 27 and power from node 28. The power supply 16 defines a common 22 from one of those two nodes 27,28. An analog sensing circuit 24 has six inputs for the three sensors 8A,8B,8C. The AC/DC power supply 16 provides a suitable DC voltage 20 and the common 22 to the μC 14 and, as needed, powers, for example, the analog sensing circuit 24.

The analog sensing circuit 24 receives inputs from the nodes 27,28, and six outputs from the sensors 8A,8B,8C from which the three currents flowing through those sensors 8A,8B,8C is determined. Various input voltage signals 29 from, for example, the analog sensing circuit 24 are input by a plural channel analog-to-digital converter (ADC) 30 of the μC 14 and are converted to corresponding digital values for input by μP 32. The μP 32 includes routines 34,100, as will be explained.

Responsive to one or more conditions as sensed from the ADC input voltage signals 29, the μP 32 generates a trip signal 36 that passes through the μC 14 to output 38 and turns SCR 40 on. The SCR 40, in turn, energizes a trip solenoid 42 and, thereby, actuates the operating mechanism 6 to trip open the separable contacts 4 in response to, for example, an overvoltage, an arc fault or other trip condition. The trip solenoid 42 is, thus, a trip actuator cooperating with the μP 32 and the operating mechanism 6 to trip open the separable contacts 4 responsive to one of the different trip conditions detected by the μP 32. A resistor 44 in series with the coil of the solenoid 42 limits the coil current and a capacitor 46 protects the gate of the SCR 40 from voltage spikes and false tripping due to noise.

High frequency isolators (HFIs) 48A,48B,48C are preferably electrically connected between the separable contacts 4A,4B,4C and sensors 8A,8B,8C, respectively. HFIs 48A, 48B,48C isolate high frequency signals generated downstream of the isolator from going upstream of the isolator, and isolate the high frequency signals generated upstream of the isolator from going downstream of the isolator.

In this example, for each phase, four current sensors are shown. For example, for phase A, sensor 8A and three high frequency (HF) current transformers (CTs) 50,51,52 are shown, although one, two, three, four or more HF current sensors may be employed. Hence, for this phase, one current sensor may feed the analog sensing circuit 24 and the three bandpass filters 54,55,56. As another example, the three HF CTs 50,51,52 not only measure the three HF current signals from the sensed current, but also measure the power frequency signal from the sensed current. The example HF CTs 50,51,52 sense di/dt and their outputs are integrated over a finite time period to obtain the current signal. The three example HF CTs are employed to optimize the outputs in the desired frequency ranges, in order that significant amplification of the HF CTs' outputs is avoided.

The outputs of the HF CTs 50,51,52 are input by the example narrow band filters 54,55,56, respectively. A non-limiting example of the first range of frequencies of the first (f1) filter 54 is about 80 kHz+/−10 kHz (center frequency to bandwidth ratio (Q) of about 8); a non-limiting example of the second range of frequencies of the second (f2) filter 55 is about 600 kHz+/−75 kHz (Q of about 8); and a non-limiting example of the last range of frequencies of the last (fn) filter 56 is about 1.6 MHz+/−200 kHz (Q of about 8). Preferably, each of the filters 54,55,56 have a center frequency to bandwidth ratio (Q) of greater than about 5. The filters 54,55,56 for the HF current signals allow the detection of arcing conditions and distinguishing an arc fault from a normal arcing condition associated with normal switching.

The outputs of the filters 54,55,56 are input by peak detectors 58,59,60, and by envelope detectors 62,63,64, respectively. The outputs of the peak detectors 58,59,60 are input by respective input channels 239,235,237 of the ADC 30. The outputs of the envelope detectors 62,63,64 are input by the negative inputs of comparators 66,67,68, respectively. Those comparators 66,67,68 use respective references REFA,REFB,REFC at their positive inputs. The outputs of the comparators 66,67,68 are input by wired-OR 70 and, also, input by a counter (TMR1) 74 of μP 32. Each of the comparators 66,67, 68 includes an output structured to indicate when the output of a corresponding one of the envelope detectors 62,64,66 is greater than the corresponding predetermined value (REFA, REFB,REFC). The wired-OR 70 is structured to provide a logical OR function from the output of each of the comparators 66,67,68. The counter 74 is structured to count high-to-low occurrences from the wired-OR 70. The μP 32 also includes a timer (TMR0) 72, as will be discussed.

Although three example sets of HF CTs 50,51,52, narrow band filters 54,55,56, peak detectors 58,59,60, envelope detectors 62,63,64 and comparators 66,67,68 are shown, any suitable number of such sets may be employed. Where a plurality (e.g., two or more) of such sets are employed, the plural high frequency, relatively narrow bands of the corresponding band pass filters (e.g., two or more of 54,55,56) are completely separated and do not overlap. Also, the plural relatively narrow bands of high frequencies need to be separated far enough, in order that they do not duplicate information as well as provide high frequency information generated by arcs in various electrical circuits. The high frequency current signals that are input by the corresponding ADC channels 239,235,237 are employed to detect arc faults. The plural frequency bands are separated apart enough to capture the high frequency signatures generated by arcs based on high frequency current signal peak detection. This takes into account the high frequency signature noise generated by the arc, while eliminating signal noises generated by the load (not shown, but electrically connected to the example terminals 12 and 26) in certain frequency bands as well as overcoming the impact caused by signal strength attenuation due to loads with capacitive impedance in the circuit, such as EMI filters (e.g., without limitation, Corcom® filters) (not shown).

The filters 54,55,56 may cover corresponding frequency bands (ranges) each of which has a different center point, which is greater than or equal to about 10 kHz and which is less than or equal to about 20 MHz. The outputs of these relatively narrow band pass filters 54,55,56 of corresponding high frequency (as detected through the corresponding envelope detectors 62,63,64) are "OR"ed by the wired-OR 70. The first envelope detector 62 cooperates with the first filter 54 to detect a plurality of first occurrences from that first pass band being within a first predetermined range of magnitudes (e.g., without limitation, about 2.652 V and higher; any suitable value). The second envelope detector 63 cooperates with the second filter 55 to detect a plurality of second occurrences from that second pass band being within a second predetermined range of magnitudes (e.g., without limitation, about 2.756 V and higher; any suitable value). The third envelope detector 64 cooperates with the third filter 56 to detect a plurality of third occurrences from that third pass band being within a third predetermined range of magnitudes (e.g., without limitation, about 2.756 V and higher; any suitable value).

A trip mechanism or trip unit, such as a suitable trip circuit 76, cooperates with the operating mechanism 6 to trip open the separable contacts 4A,4B,4C of the three example poles. The trip circuit 76 includes the μC 14, the sensors 8A,8B,8C, the HF CTs 50,51,52, the filters 54,55,56, the peak detectors 58,59,60, the envelope detectors 62,63,64, the comparators 66,67,68, the wired-OR 70 and the trip solenoid 42.

Figure 2:
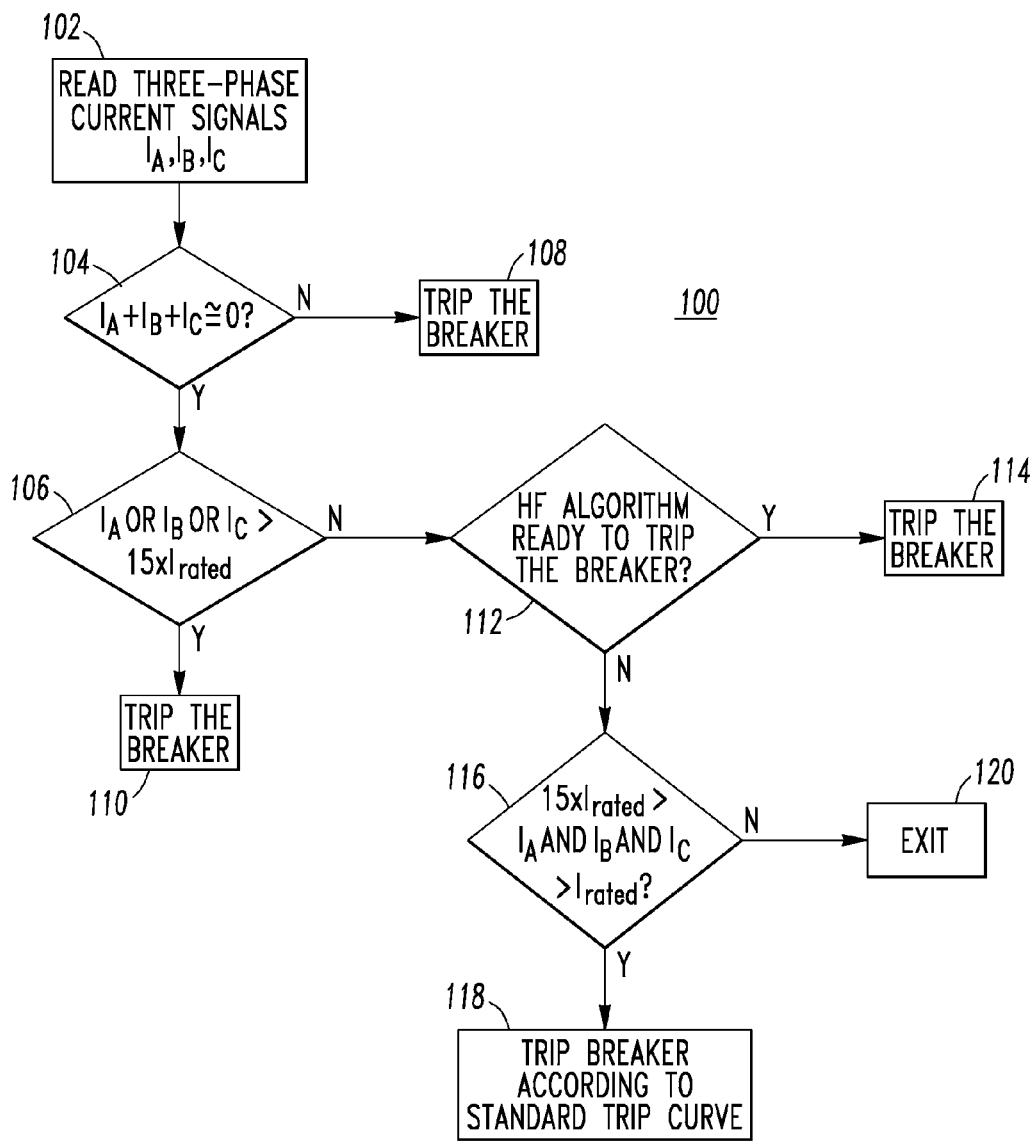
FIG. 2 is a flowchart of a routine to coordinate the instantaneous trip function, the high frequency trip function, the standard trip curve function and the ground fault trip function of the circuit breaker of FIGS. 1A-1B.
Figure 3A:
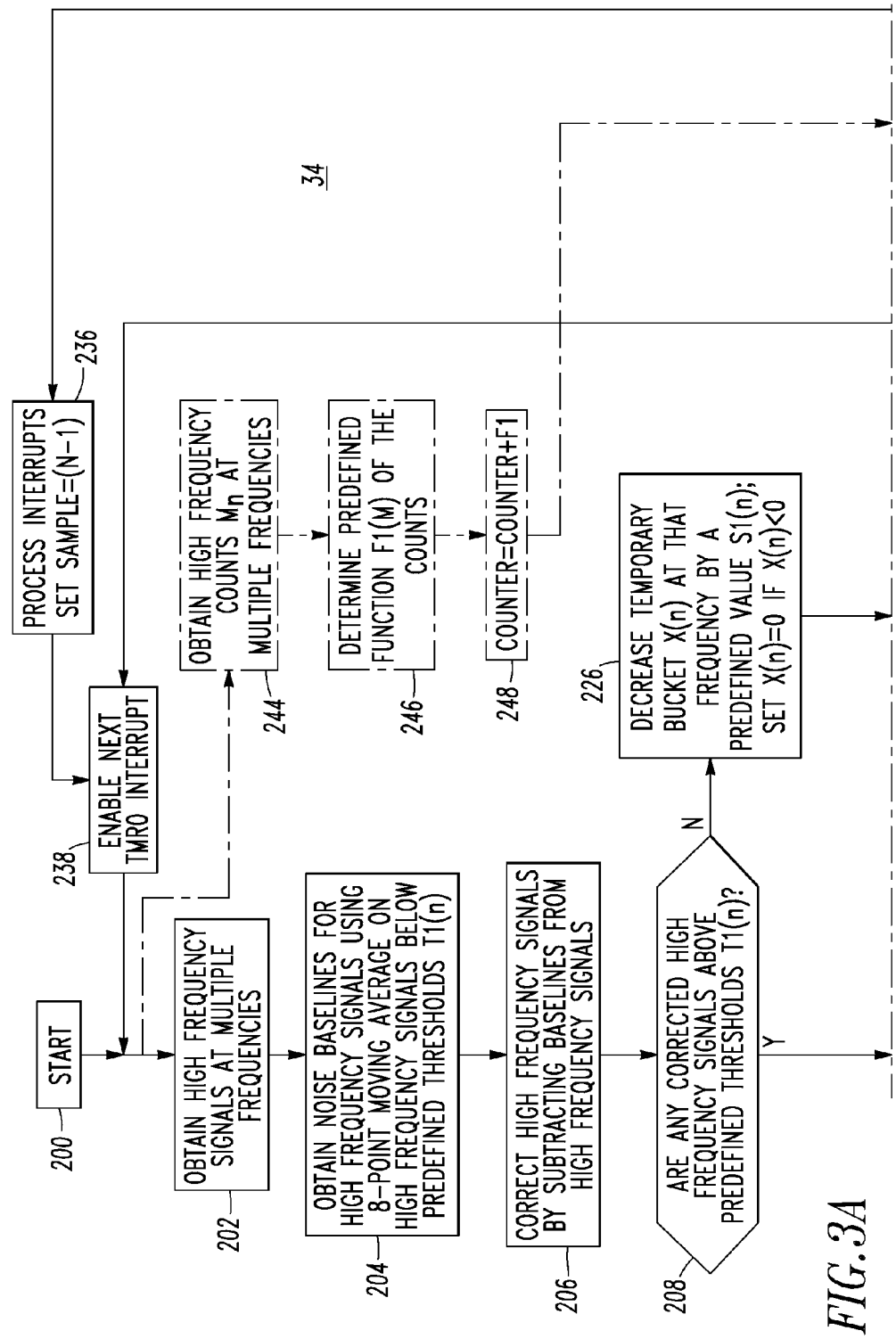
FIGS. 3A-3C form a flowchart of the high frequency trip function routine of the circuit breaker of FIGS. 1A-1B.
Figure 3B:
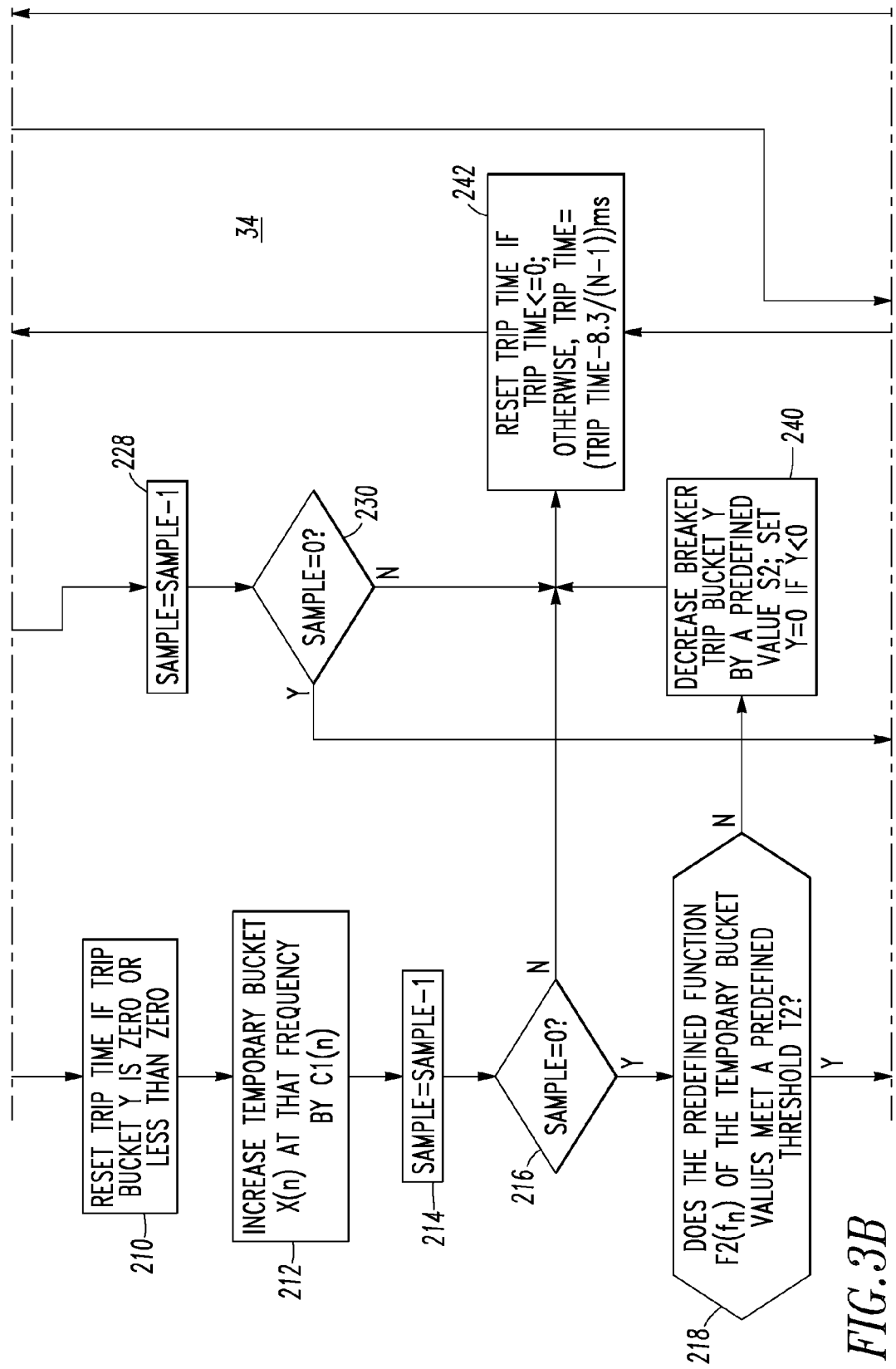
Figure 3C:
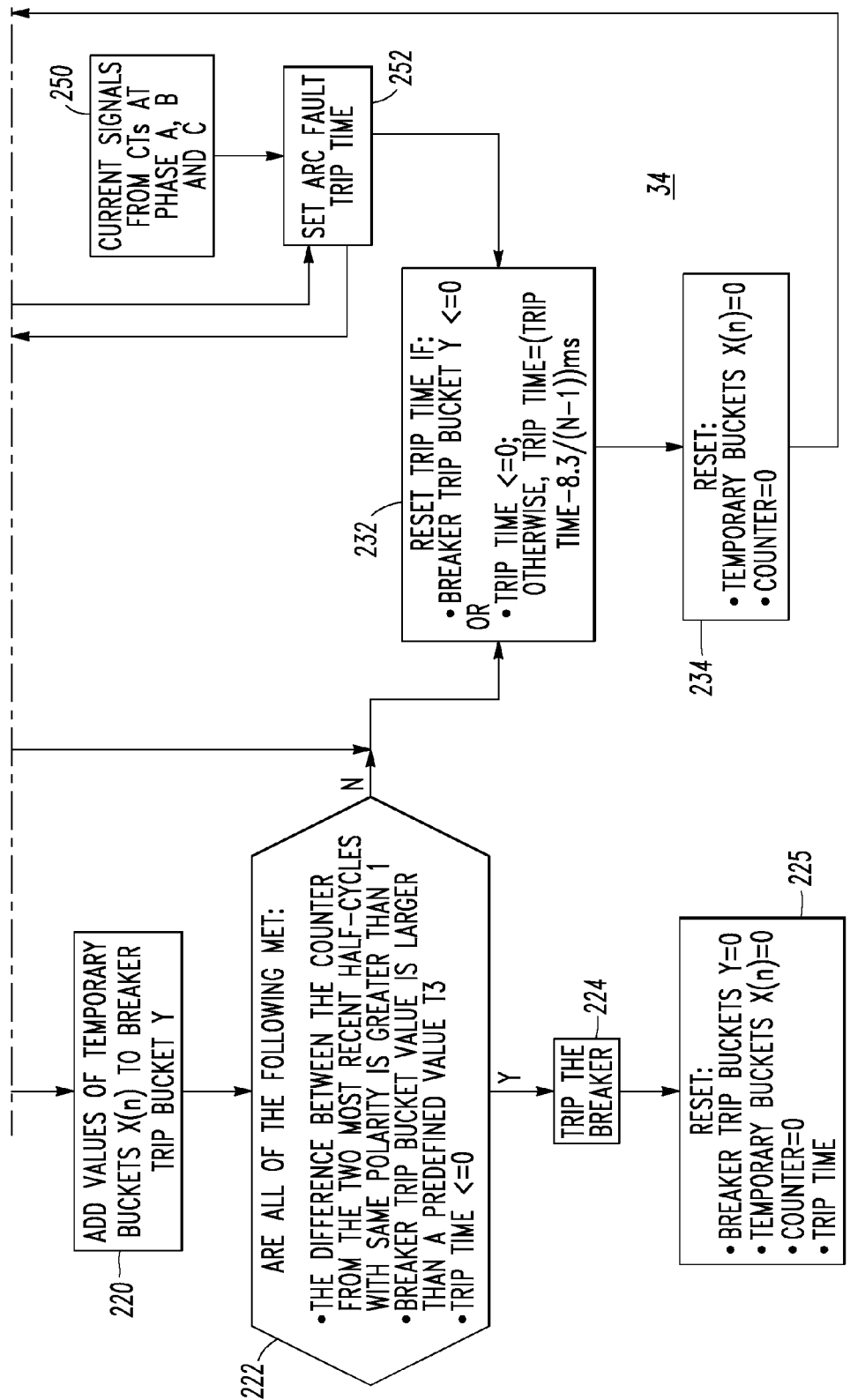
Figure 4:
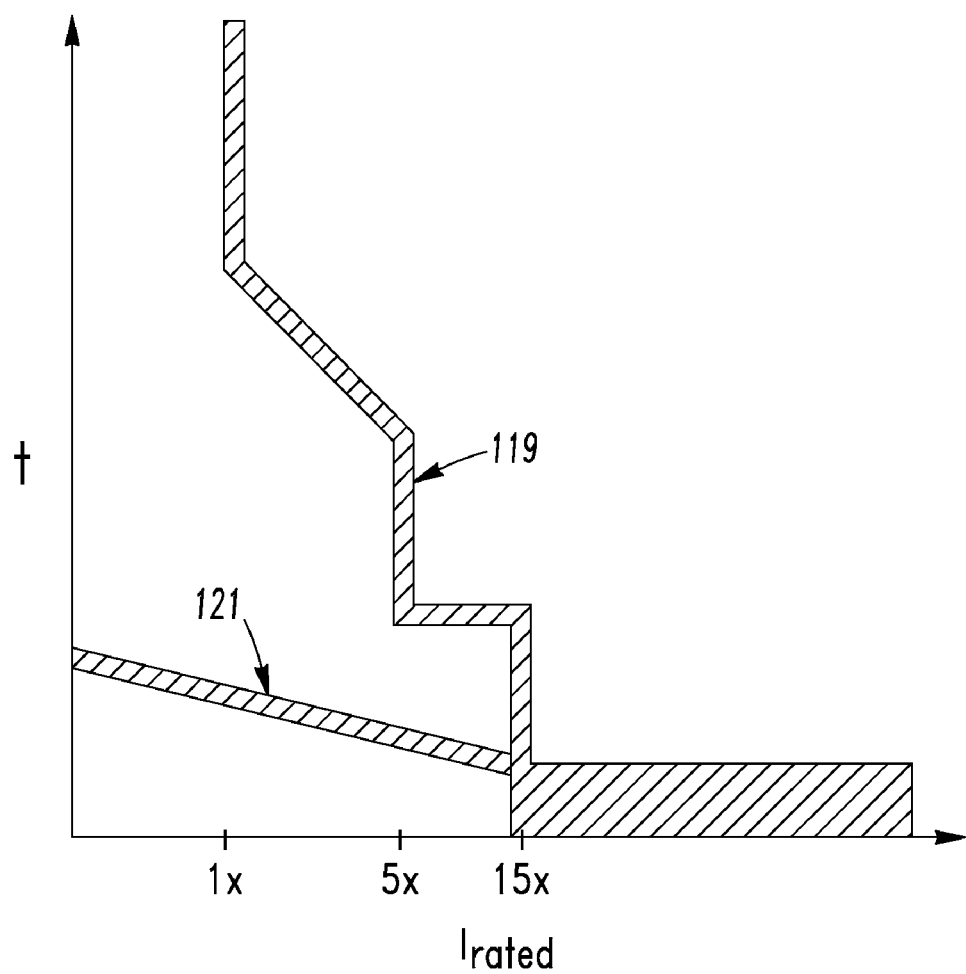
FIG. 4 is a plot of current versus time for the high frequency trip function and the standard trip curve function of the circuit breaker of FIGS. 1A-1B.

Referring to FIG. 2, the routine 100 coordinates an instantaneous trip function, the high frequency trip function routine 34 (FIGS. 3A-3C), a standard trip curve function and a ground fault trip function of the circuit breaker 2 of FIGS. 1A-1B. The routine 100 runs at least once every line cycle. First, at 102, the μP 32 (FIG. 1A) reads the three-phase current signals ($I_A, I_B, I_C$) from the ADC 30 as input from the analog sensing circuit 24 from the sensors 8A,8B,8C. Next, at 104, it is determined if the sum of the three-phase current signals ($I_A+I_B+I_C$) is equal to or suitably close to zero, in order to check for a conventional ground fault trip condition. If so, then execution resumes at 106. Otherwise, the circuit breaker 2 is tripped by generating the trip signal 36 that passes through the μC 14 to output 38 and turns SCR 40 on. At 106, it is determined if any of the three-phase current signals ($I_A$ or $I_B$ or $I_C$) is greater than a predetermined value (e.g., without limitation, 15; 13; any suitable value) times rated current (Irated). If so, then the circuit breaker 2 is instantaneously tripped at 110, in the same manner as was discussed at 108. On the other hand, if all of the three-phase current signals ($I_A$ and $I_B$ and $I_C$) are less than or equal to the predetermined value (e.g., without limitation, 15; 13; any suitable value) times rated current (Irated), then, at 112, it is determined if the HF algorithm of the routine 34 of FIGS. 3A-3C is ready to trip the circuit breaker 2 (e.g., if an arcing high frequency current signal continues for more than a predetermined trip time). If so, then the circuit breaker 2 is tripped at 114, as was discussed at 108. As will be discussed in connection with FIGS. 3A-3C and 4, the routine 34 determines a corresponding arc fault trip time when the test at 106 is not met. There, the conventional trip curve 119 is overridden if the HF algorithm of the routine 34 confirms an arc fault, in which case the circuit breaker 2 trips according to the arc fault trip time defined at 252 of FIG. 3C.

On the other hand, if the HF algorithm of the routine 34 of FIGS. 3A-3C is not ready to trip the circuit breaker 2, then, at 116, it is determined if all of the three-phase current signals ($I_A$ and $I_B$ and $I_C$) are less than the predetermined value (e.g., without limitation, 15; 13; any suitable value) times rated current (Irated) and are also greater than rated current (Irated). If so, then, at 118, the circuit breaker is tripped, if appropriate, as determined by considering a conventional trip curve, as is shown at 119 of FIG. 4, which trip curve is defined by time and sensed current. On the other hand, if the test of 116 is not met, then, at 120, the routine 100 exits.

The routine 100 is preferably used to enable or enhance the "selective coordination" of multiple circuit breakers. In such selective coordination, a main circuit breaker is able to either stay closed or open momentarily, in order to help branch circuit breakers to interrupt a fault if a fault event occurs in a branch circuit, in order that other branch circuits are not affected. Otherwise, if a fault occurs between the main circuit breaker and the branch circuit breakers, then the main breaker should trip immediately.

Referring to FIGS. 3A-3C, the high frequency trip function routine 34 is shown. The routine 34 runs eight times per line half-cycle. After starting at 200, at 202, the μP 32 (FIG. 1A) reads the HF current signals from the ADC 30 as input from the peak detectors 58,59,60. For clarity, for the example three-phase circuit breaker 2, with a number ("n") of sets of HF CTs 50,51,52, narrow band filters 54,55,56, and peak detectors 58,59,60, this includes "3n" HF current signals. Thus, if "n" is, for example, three (not to be confused with the three phases), then there are nine (3n=3×3) HF current signals.

Next at, 204, noise baselines (NBn) are obtained for the HF current signals using, for example, an 8-point moving average on the HF current signals below corresponding predetermined thresholds (T1(n)). Here, there may be different predetermined thresholds (T1(1), T1(2), . . . T1(n)) (e.g., without limitation, 120, 100, 80; any suitable values) for the different HF current signals, which pass through the different filters, such as 54,55,56. If a particular HF current signal is above the corresponding predetermined threshold, then it is ignored. Hence, the example 8-point moving average is determined for each different HF current signal based upon the last eight samples of that HF current signal that are below the corresponding predetermined threshold.

For example, for one HF current signal, the previous eight samples of that HF current signal are all below the corresponding predetermined threshold, and the corresponding baseline is the average of those signals. For example, for another HF current signal, the previous twenty samples of that HF current signal have twelve samples above and eight samples below the corresponding predetermined threshold, and the corresponding baseline is the average of those eight samples. For example, for another HF current signal, the previous nine samples of that HF current signal have one sample above and eight samples below the corresponding predetermined threshold, and the corresponding baseline is the average of those eight samples.

Next, at 206, the various HF current signals are corrected by subtracting the corresponding baselines (NBn) from those HF current signals. This adjusts the HF current signals to remove baseline noise. Then, at 208, it is determined if any of the corrected HF current signals are above the corresponding predetermined thresholds (T1(n)). If so, then at 210, an arc fault trip time (discussed below in connection with 252) is reset if a trip bucket (Y) (discussed below in connection with 220) is less than or equal to zero. Next, at 212, for those HF current signals that are above the corresponding predetermined thresholds (T1(n)) at 208, a temporary bucket (X(n)) at the corresponding frequency is increased by a corresponding predetermined value (C1(n)) (e.g., without limitation, 15, 10, 5; any suitable values) at that corresponding frequency. Then, at 214, a variable Sample is decremented. This variable is initialized, at 236, to "N−1", where, for example and without limitation, N=8, for eight example samples per half-cycle. Next, at 216, if the decremented variable Sample is equal to zero, then execution resumes at 218.

At 218, it is determined if a predetermined function (F2 (fn)) of the temporary bucket values (X(n)) meets a predetermined threshold (T2) (e.g., without limitation, zero; any suitable value). As a non-limiting example, F2=X(1)*X(2) . . . *X(n)>T2=0. This is repeated for all three of the phases. If this test is met, then at 220, the values of all of the temporary buckets (X(n)) are added to the trip bucket (Y). Again, this is repeated for all three of the phases.

Next, at 222, it is determined if three criteria are met: (i) the difference in the value of the counter 74 (TMR1) of FIG. 1A from the two most recent half-cycles with the same polarity (positive or negative) is greater than one; (ii) the trip bucket (Y) is larger than a predetermined value (T3) (e.g., without limitation, 300; any suitable value); and (iii) the arc fault trip time is less than or equal to zero. If this test is met, then the circuit breaker 2 is tripped at 224 in the manner discussed above in connection with step 108 of FIG. 2. Next, at 225, the trip bucket (Y), the various temporary bucket values (X(n)) and the counter 74 (TMR1) (FIG. 1A) are all set to zero, and the arc fault trip time is reset (as is discussed at 252). Here, the reset will occur when the circuit breaker is reset.

If the test at 208 failed, then at 226, the various temporary bucket values (X(n)) at the corresponding frequencies are decreased by predetermined values (SI (n)) (e.g., without limitation, 5, 10, 15; any suitable values) at the corresponding frequencies. Here, if any temporary bucket value (X(n)) would be less than zero, then it is set to zero. Then, at 228, the variable Sample is decremented. Next, at 230, if the decremented variable Sample is equal to zero, then execution resumes at 232.

At 232, the arc fault trip time is reset if either: (i) the trip bucket (Y) is less than or equal to zero; or (ii) the arc fault trip time is less than or equal to zero. Otherwise, the arc fault trip time is decreased by a suitable predetermined time (e.g., without limitation, 8.333 mS/(N−1), where, N=8 for 8 samples or interrupts per half-cycle, or about 1.19 mS; any suitable time). Then, at 234, the various temporary bucket values (X(n)) and the counter 74 (TMR1) (FIG. 1A) are all set to zero. Next, at 236, interrupts are processed in order to process data from the previous half cycle, prepare for the next TMR0 interrupt, and initialize the variable Sample to "N−1". Then, at 238, the next interrupt, as defined by timer 72 (TMR0) is enabled. This is set to a period suitable to provide the example eight samples per half-cycle. After 238, execution resumes at 202 with the next interrupt. In this non-limiting example, there is an initial interrupt at about the zero crossing followed by 7 more interrupts, which make 8 total interrupts.

If the test failed at 218, then, at 240, the trip bucket Y is decreased by a predetermined value (S2) (e.g., without limitation, 8; any suitable value). Here, if the trip bucket Y would be less than zero, then it is set to zero. Then, at 242, the arc fault trip time is reset if the arc fault trip time is less than or equal to zero. Otherwise, the arc fault trip time is decreased by a suitable predetermined time (e.g., without limitation, 8.333 mS/(N−1), where, N=8 for 8 samples per half-cycle, or about 1.19 mS; any suitable time).

Even steps 244-248 (shown in phantom line drawing) are not performed by the firmware of the routine 34 and, instead, are provided by the envelope detectors 62,63,64, comparators 66,67,68, wired-OR 70 and counter 74 (TMR1) of FIG. 1A. At 244, the various high frequency counts $M_n$ at various frequencies corresponding to the filters 54,55,56 are determined. Then, at 246, a predetermined function (F1(M)) of the counts of 244 is determined (e.g., without limitation, F1=$M_1$+$M_2$+$M_3$). Then, at 248, the counter 74 is incremented by the amount F1.

Even steps 250 and 252 show the determination of the arc fault trip time. These steps are executed, as needed, for steps 210, 232 and/or 242, which reset the arc fault trip time. At 250, the μP 32 reads the three-phase current signals ($I_A,I_B,I_C$) from the ADC 30 as input from the analog sensing circuit 24 from the sensors 8A,8B,8C. Then, at 252, the arc fault trip time is set based upon, for example, the current levels from 250, the rated current and, if appropriate, "selective coordination". As a non-limiting example, the arc fault trip time is set, if all of the current signals ($I_A,I_B,I_C$) are less than a predetermined value (e.g., without limitation, 15; 13; any suitable value) times the rated current (Irated), to 1000−60*I, where I is preferably the three-phase RMS average value. Alternatively, "I" can be, for example, a three-phase peak average value, any one of the three three-phase currents ($I_A$, $I_B$, $I_C$), or the maximum of the three three-phase currents. This, then provides the example industrial arc fault circuit interrupter trip curve 121 of FIG. 4. This trip curve 121 is employed to detect arcing conditions at a plurality of different values of the sensed example three-phase currents.

Example 1

The disclosed circuit interrupter 2 may be, for example and without limitation, a molded case circuit breaker (MCCB) for industrial applications.

Example 2

For a single-phase system, instead of checking for a three-phase current imbalance for a three-phase system (at 104 of FIG. 2), there is the conventional check if the difference between the load current and the load-neutral current is significantly different than zero (e.g., without limitation, any suitable equipment protection ground fault trip level; about 30 mA or higher).

Example 3

For each of the number of high frequency current signals, there is one narrow band filter (54, 55 or 56), one peak detector (58, 59 or 60), one envelope detector (62, 63 or 64) and one corresponding comparator (66, 67 or 68). Since there may be one or more high frequency current signals, there may be any number of sets of the narrow band filters, the peak detectors, the envelope detectors and the corresponding comparators.

Example 4

There may be one high frequency current transformer (CT) (50,51,52) for each high frequency current signal. Alternatively, one CT may be employed for plural different high frequency current signals.

Example 5

The example range of 100 ms to 1000 ms for the arc fault trip time of FIGS. 3A-3C and 4 may be any suitable range. As long as the range does not cause nuisance tripping, the arc fault trip time can be as short as possible.

Example 6

Although a MCCB is disclosed, a wide range of circuit breakers may be employed (e.g., without limitation, an air circuit breaker (ACB); a power circuit breaker (PCB)).

Example 7

Although FIG. 1B shows three (n=3) band pass filters 54,55,56, the invention is applicable to any suitable number (n) of band pass filters. As non-limiting examples, if n=1, then the frequency (f1) of the single band pass filter is: 100 kHz<f1<1 MHz; if n=2, then the frequencies (f1 and f2) of the two band pass filters are: 80 kHz<f1<300 kHz, and 700 kHz<f2<1 MHz; and if n=3, then the frequencies (f1, f2 and f3) of the three band pass filters are: 80 kHz<f1<300 kHz, 400 kHz<f2<600 kHz, and 700 kHz<f3<2 MHz.

Example 8

For n=1, the single frequency (f1) should be able to provide adequate indications for detecting an arc fault while not nuisance tripping on electrical loads. In the two-frequency (n=2) case, signals at both f1 and f2 are used to trip the circuit breaker 2 using an "or" function. If n=1, then it will only depend on the signal at f1 to trip the circuit breaker 2.

Example 9

For n=3, three suitable ranges of frequencies (f1, f2 and f3) may be employed. As another non-limiting example, 10 kHz<f1<80 kHz, 800 kHz<f2<1 MHz, and 1.9 MHz<f3<2 MHz.

Example 10

The example trip circuit 76 of FIGS. 1A-1B may be integrated with an existing electronic trip unit using the current transformers of such electronic trip unit for high frequency current sensing.

Although separable contacts 4A,4B,4C are disclosed, suitable solid state separable contacts may be employed. For example, the disclosed circuit breaker 2 includes a suitable circuit interrupter mechanism, such as the separable contacts 4A,4B,4C that are opened and closed by the operating mechanism 6, although the invention is applicable to a wide range of circuit interruption mechanisms (e.g., without limitation, solid state or FET switches; contactor contacts) and/or solid state based control/protection devices (e.g., without limitation, drives; soft-starters).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit interrupter comprising:
a number of poles, each of said number of poles comprising a pair of separable contacts;
an operating mechanism structured to open and close said pair of separable contacts for said number of poles; and
a trip mechanism cooperating with said operating mechanism to trip open said number of poles, said trip mechanism comprising a processor and further comprising for each of said number of poles:
a first current sensor structured to sense current flowing through said pair of separable contacts of a corresponding one of said number of poles,
a number of second current sensors structured to sense a number of high frequency current signals from the current flowing through said pair of separable contacts of the corresponding one of said number of poles,
a number of bandpass filters, each of said number of bandpass filters including an input receiving one of said number of high frequency current signals and an output,
a number of peak detectors, each of said number of peak detectors including an input receiving the output of a corresponding one of said number of bandpass filters and an output, and
a number of envelope detectors, each of said number of envelope detectors including an input receiving the output of a corresponding one of said number of bandpass filters and an output,
wherein said processor is structured to:
count a count of occurrences of the output of each of said number of envelope detectors exceeding a first predetermined value,
maintain a number of temporary values corresponding to the output of each of said number of peak detectors,
determine an arc fault trip time as a function of the sensed current flowing through said pair of separable contacts for said number of poles,
determine if the output of any of said number of peak detectors is greater than a second predetermined value, and, if so, responsively increase a corresponding one of said number of temporary values by a third predetermined value and, if not, decrease the corresponding one of said number of temporary values by a fourth predetermined value,
determine if a predetermined function of said number of temporary values is greater than a fifth predetermined value, and, if so, for each of said number of peak detectors, add the corresponding one of said number of temporary values to an accumulator, and if not, decrease the accumulator by a sixth predetermined value, and
cause said operating mechanism to trip open said number of poles if: (a) a difference between said count corresponding to the current one of said half cycles having a polarity and said count corresponding to the immediately previous one of said half cycles having the same polarity is at least two, (b) said accumulator is greater than a seventh predetermined value, and (c) the arc fault trip time is reached.

2. The circuit interrupter of claim 1 wherein said processor is further structured to reset the arc fault trip time if either: (1)(a) said difference is not at least two, or said accumulator is not greater than the seventh predetermined value, or the arc fault trip time is not reached, and (b) said accumulator is less than or equal to an eighth predetermined value; or (2)(a) said difference is not at least two, or said accumulator is not greater than the seventh predetermined value, and (b) the arc fault trip time is reached.

3. The circuit interrupter of claim 2 wherein said processor is further structured to reset said count corresponding to the current one of said half cycles and reset said number of temporary values.

4. The circuit interrupter of claim 1 wherein the current flowing through said pair of separable contacts of the corresponding one of said number of poles is an alternating current including a plurality of half-cycles; wherein said processor is further structured to input for each of said half-cycles a plurality of samples of each of said number of high frequency current signals; and wherein said processor is further structured to collect all of said samples before determining, for each of said number of peak detectors, if the corresponding one of said number of temporary values is greater than the fifth predetermined value.

5. The circuit interrupter of claim 1 wherein the current flowing through said pair of separable contacts of the corresponding one of said number of poles is an alternating current including a plurality of half-cycles; and wherein said processor is further structured to input for each of said half-cycles eight samples of each of said number of high frequency current signals.

6. The circuit interrupter of claim 1 wherein said circuit interrupter includes a rated current; and wherein said processor is further structured to determine the arc fault trip time as a function of the sensed current flowing through said pair of separable contacts of at least one of said number of poles.

7. The circuit interrupter of claim 6 wherein the function of the sensed current is employed by said processor when the sensed current flowing through said pair of separable contacts of said at least one of said number of poles is less than a ninth predetermined value times said rated current; and wherein the arc fault trip time is equal to a tenth predetermined value less an eleventh predetermined value times the sensed current flowing through said pair of separable contacts of at least one of said number of poles.

8. The circuit interrupter of claim 1 wherein said circuit interrupter has a rated current; and wherein said processor is further structured to cause said operating mechanism to trip open said number of poles if said sensed current flowing through said pair of separable contacts of any of said number of poles is greater than an eighth predetermined value times said rated current.

9. The circuit interrupter of claim 8 wherein said processor is further structured to determine said arc fault trip time when the sensed current flowing through said pair of separable contacts of all of said number of poles is less than or equal to a ninth predetermined value times said rated current.

10. The circuit interrupter of claim 8 wherein said processor is further structured to cause said operating mechanism to trip open said number of poles responsive to at least one of: (a) a trip curve defined by time and said sensed current; and (b) a ground fault trip condition.

11. The circuit interrupter of claim 10 wherein said processor is further structured to consider said trip curve when said sensed current flowing through said pair of separable contacts of all of said number of poles is less than the eighth predetermined value times said rated current and when said sensed current flowing through said pair of separable contacts of all of said number of poles is greater than said rated current.

12. The circuit interrupter of claim 6 wherein said processor is further structured to detect arcing conditions at a plurality of different values of the sensed current flowing through said pair of separable contacts of one of said number of poles, said different values ranging from about zero to about fifteen times said rated current.

13. The circuit interrupter of claim 1 wherein said circuit interrupter is an industrial arc fault circuit interrupter.

14. The circuit interrupter of claim 1 wherein said processor is further structured to adjust said number of high frequency current signals to remove baseline noise.

15. The circuit interrupter of claim 14 wherein said processor is further structured to determine said baseline noise from a moving average of a plurality of samples of said number of high frequency current signals, which are below the second predetermined value.

16. The circuit interrupter of claim 1 wherein a high frequency isolator is electrically connected between the first current sensor and said pair of separable contacts of the corresponding one of said number of poles.

17. The circuit interrupter of claim 1 wherein said number of second current sensors is a plurality of high frequency current transformers.

18. The circuit interrupter of claim 1 wherein each of said number of bandpass filters includes a frequency band having a center point, which is greater than or equal to about 10 kHz and which is less than or equal to about 20 MHz.

19. The circuit interrupter of claim 1 wherein said number of high frequency current signals is a plurality of high frequency current signals; wherein said number of bandpass filters is a plurality of bandpass filters; wherein said number of peak detectors is a plurality of peak detectors; wherein said number of envelope detectors is a plurality of envelope detectors; wherein said processor comprises a plurality of comparators, an OR function and a counter, each of said number of comparators including an output structured to indicate when the output of a corresponding one of said envelope detectors is greater than the first predetermined value, said OR function including an output structured to provide a logical OR from the output of each of said comparators, said counter being structured to count occurrences from the output of said OR function.

20. The circuit interrupter of claim 1 wherein said trip mechanism is a trip unit.

21. A method of detecting arcing conditions, said method comprising:
   sensing current flowing through a power circuit;
   sensing a number of high frequency current signals from said current flowing;
   bandpass filtering each of said number of high frequency current signals and providing a number of corresponding bandpass filtered signals;
   detecting a number of peak signals from the number of corresponding bandpass filtered signals;
   detecting a number of envelopes from the number of corresponding bandpass filtered signals;
   counting a count of occurrences of the number of envelopes exceeding a first predetermined value;
   maintaining a number of temporary values corresponding to the number of peak signals;
   determining an arc fault trip time as a function of said sensed current flowing;
   determining if any of the number of peak signals is greater than a second predetermined value, and, if so, responsively increasing a corresponding one of said number of temporary values by a third predetermined value and, if not, decreasing the corresponding one of said number of temporary values by a fourth predetermined value;

determining if a predetermined function of said number of temporary values is greater than a fifth predetermined value, and, if so, adding said number of temporary values to an accumulator, and if not, decreasing the accumulator by a sixth predetermined value; and tripping open said power circuit if: (a) a difference between said count corresponding to the current one of said half cycles having a polarity and said count corresponding to the immediately previous one of said half cycles having the same polarity is at least two, (b) said accumulator is greater than a seventh predetermined value, and (c) the arc fault trip time is reached.

22. A circuit interrupter comprising:

separable contacts;

an operating mechanism structured to open and close said separable contacts; and a trip mechanism cooperating with said operating mechanism to trip open said separable contacts, said trip mechanism comprising:

a processor, a first current sensor structured to sense current flowing through said separable contacts, a number of second current sensors structured to sense a number of high frequency current signals from the current flowing through said separable contacts, a number of bandpass filters, each of said number of bandpass filters including an input receiving one of said number of high frequency current signals and an output, a number of peak detectors, each of said number of peak detectors including an input receiving the output of a corresponding one of said number of bandpass filters and an output, and a number of envelope detectors, each of said number of envelope detectors including an input receiving the output of a corresponding one of said number of bandpass filters and an output, wherein said processor is structured to:

count a count of occurrences of the output of each of said number of envelope detectors exceeding a first predetermined value, maintain a number of temporary values corresponding to the output of each of said number of peak detectors, determine an arc fault trip time as a function of the sensed current flowing through said pair of separable contacts for said number of poles, determine if the output of any of said number of peak detectors is greater than a second predetermined value, and, if so, responsively increase a corresponding one of said number of temporary values by a third predetermined value and, if not, decrease the corresponding one of said number of temporary values by a fourth predetermined value, determine if a predetermined function of said number of temporary values is greater than a fifth predetermined value, and, if so, for each of said number of peak detectors, add the corresponding one of said number of temporary values to an accumulator, and if not, decrease the accumulator by a sixth predetermined value, and cause said operating mechanism to trip open said separable contacts if: (a) a difference between said count corresponding to the current one of said half cycles having a polarity and said count corresponding to the immediately previous one of said half cycles having the same polarity is at least two, (b) said accumulator is greater than a seventh predetermined value, and (c) the arc fault trip time is reached.

* * * * *